Figure 2:
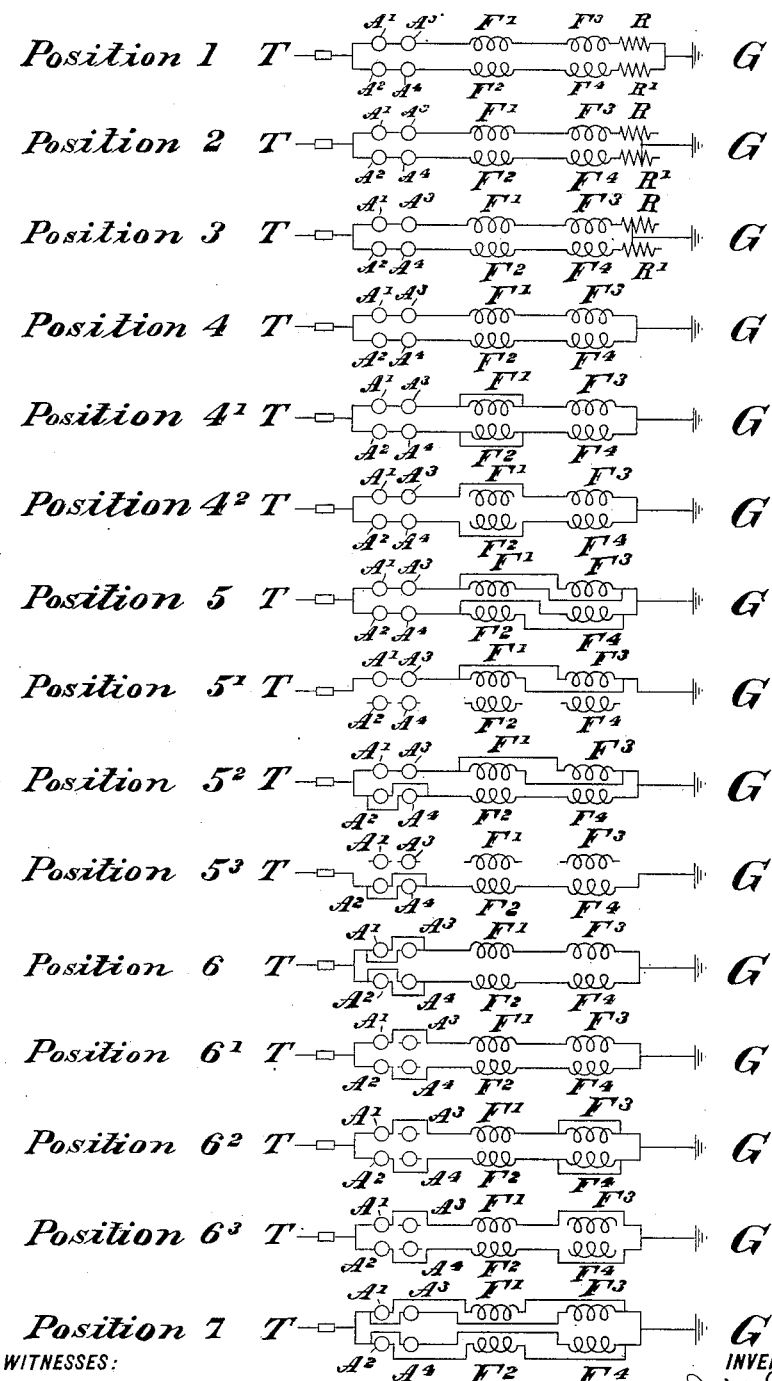

No. 661,972. Patented Nov. 20, 1900.
F. W. GARRETT.
CONTROLLER FOR ELECTRIC MOTORS.
(Application filed June 5, 1900.)
(No Model.) 3 Sheets—Sheet 1.

Fig. 1.

WITNESSES:
G. M. Powell.
B. M. Smith.

INVENTOR
F. W. Garrett,
BY
Geo. H. Parmelee,
his ATTORNEY.

No. 661,972. Patented Nov. 20, 1900.
F. W. GARRETT.
CONTROLLER FOR ELECTRIC MOTORS.
(Application filed June 5, 1900.)
(No Model.) 3 Sheets—Sheet 2.

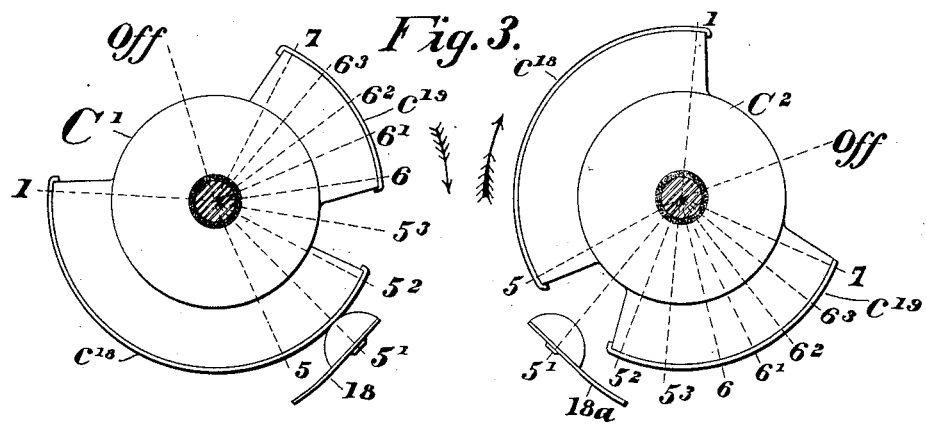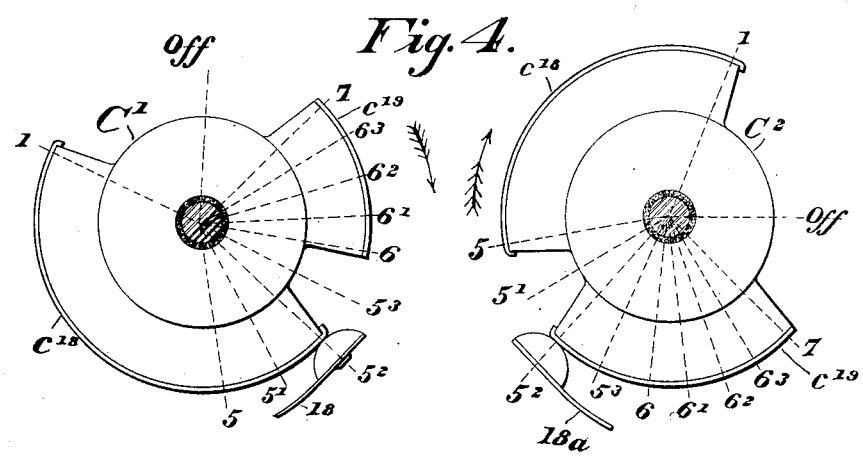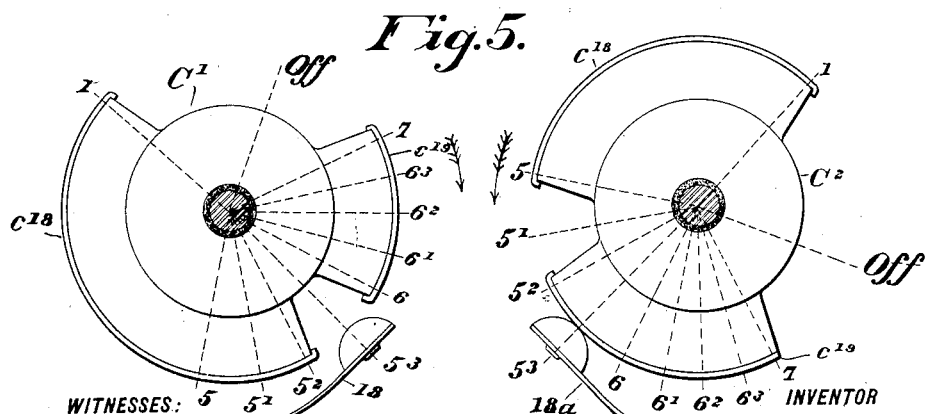

UNITED STATES PATENT OFFICE.

FRANK W. GARRETT, OF JOHNSTOWN, PENNSYLVANIA, ASSIGNOR TO THE LORAIN STEEL COMPANY, OF PENNSYLVANIA.

CONTROLLER FOR ELECTRIC MOTORS.

SPECIFICATION forming part of Letters Patent No. 661,972, dated November 20, 1900.

Original application filed March 26, 1900, Serial No. 10,151. Divided and this application filed June 5, 1900. Serial No. 19,144. (No model.)

*To all whom it may concern:*

Be it known that I, FRANK W. GARRETT, of Johnstown, in the county of Cambria and State of Pennsylvania, have invented a new and useful Improvement in Controllers for Electric Motors, of which the following is a full, clear, and exact description, reference being had to the accompanying drawings, which form a part of this specification.

My invention has relation to certain new and useful improvements in controllers for electric motors, and is more particularly designed to provide means for carrying into effect the method of control described and claimed in my pending application, Serial No. 10,151, filed March 26, 1900, of which the present application is a division. Generally considered, that method consists in arranging the motors in two or more parallel groups, starting them from a position of rest with the motors of each group connected in series, and then by intermediate circuit changes connecting the motors of each group in parallel, certain of such intermediate changes being effected in one group in advance of similar changes in the other group or groups and while the latter are actively connected in circuit. The intermediate circuit changes above referred to are preferably of such character as not to require the use of external resistance in connection therewith.

Broadly considered, my invention consists in a controller arranged to connect the motors in multiple groups and having series paralleling contacts for each group arranged in such a manner as to effect certain circuit changes in one group in passing from series to parallel in advance of similar changes in the other group or groups.

It also consists in a controller having contacts arranged to effect the peculiar circuit conditions, which are preferably employed in the intermediate steps in passing from series to parallel, and also in the novel construction, arrangement, and combination of parts, all as hereinafter described, and pointed out in the appended claims, reference being had to the accompanying drawings, forming a part of this specification.

Figure 1 is a diagram showing a controller development and circuit arrangement suitable for the practice of my invention. Fig. 2 is a graphic representation of the motor-circuits in the several positions of the controller-drums; and Figs. 3, 4, and 5 are planular sections of the controller-drum, showing the relative positions of their contacts at certain positions of the drums.

In the figures, $M'$, $M^2$, $M^3$, and $M^4$ indicate four electric motors, whose armatures are designated, respectively, as $A'$, $A^2$, $A^3$, and $A^4$ and their field-coils $F'$, $F^2$, $F^3$, and $F^4$. T indicates the connection to the trolley or supply side of the circuit. G, whenever seen, indicates a ground connection. CS designates the canopy-switches; FB, a fuse-box; LA, a lightning-arrester, and CC a choke-coil. These parts are of any usual character and form no part of my invention.

$C'$ $C^2$ represent in development the two controller-drums.

BOC is the blow-out coil therefor, and RS the reversing-switch.

R R' designate artificial resistance-boxes for connection in circuit with the motors in starting from or approaching a position of rest.

The drums $C'$ $C^2$ in so far as their mechanical arrangement is concerned are of a well-known type, being intergeared with each other in any well-known or usual manner to move in unison by the operation of a single lever or handle. Each drum $C'$ $C^2$ carries six groups of contacts, the individual contacts of each group being electrically connected with each other, while the several groups are electrically disconnected. The contacts of the first group on each drum are marked $c$ to $c^6$, inclusive; those of the second group $c^7$ to $c^{10}$, inclusive; those of the third group $c^{11}$ to $c^{15}$, inclusive; those of the fourth group $c^{16}$ to $c^{20}$, inclusive; those of the fifth group $c^{21}$ to $c^{24}$, inclusive, and those of the sixth group $c^{25}$ to $c^{28}$, inclusive.

While the number of contacts is the same on both drums, as is also their general arrangement or grouping, it will be noted that the contacts $c^{11}$, $c^{12}$, $c^{15}$, $c^{18}$, $c^{20}$, $c^{25}$, and $c^{26}$ on the drum $C'$ are longer than the corresponding contacts on the drum $C^2$, in that on the drum $C^2$ these contacts terminate on or slightly beyond the indicated position 5, whereas on the drum $C'$ they extend to a point slightly beyond the dotted line indicating the position 52. It will also be noticed that the contacts $c^3$, $c^8$, $c^{10}$, $c^{16}$, $c^{17}$, $c^{19}$, $c^{21}$, $c^{23}$, $c^{27}$, and $c^{28}$ on the drum $C^2$ are longer than the corresponding contacts on the drum $C'$, being extended farther to the left, so that while on the drum $C'$ these contacts are first engaged when the drum is turned to the position 6 on the drum $C^2$ they are first engaged at the position 52. The contact-fingers which coöperate with the contacts of the drum $C'$ are designated by the numbers 10 to 22, inclusive, while the fingers which coöperate with the contacts of the drum $C^2$ are designated by the reference characters $10^a$ to $22^a$, inclusive. The reversing-switch RS is of well-known type and need not be described, being shown only for the purpose of completing the electrical connections. In tracing the circuits hereinafter it will be assumed that its series of contact-fingers are engaging the contacts on the dotted line marked "ahead" and designated by $z$ $z'$ $z^2$, &c., to $z^{15}$. Contact-fingers 10, 11, and 12 are electrically connected to the resistance-box R to connect in circuit, respectively, a decreasing amount of the resistance therein, and fingers $10^a$, $11^a$, and $12^a$ are similarly connected to the resistance-box $R'$. Finger 12 is also connected to one terminal of the field-coil $F^3$, and finger $12^a$ is similarly connected to one terminal of the field-coil $F^4$. Finger 13 is electrically connected to finger 14, and the latter is connected to one terminal of the field-coil $F'$. Finger $13^a$ is connected to finger $14^a$ and the latter to one terminal of the field-coil $F^2$. Finger 15 is connected to one side of the field-coil $F^3$ and finger $15^a$ to the corresponding side of field-coil $F^4$. Fingers 16 and $16^a$ are respectively connected to armatures $A^3$ and $A^4$ through the reversing-switch, and the return connections from said armatures through said switch are made, respectively, with the fingers 19 and $19^a$. Fingers 17 and $17^a$ are respectively connected to field-coils $F'$ and $F^2$. Fingers 18 and $18^a$ are respectively connected to armatures $A'$ and $A^2$, the return connections also through said switch being to the fingers 21 and $21^a$, respectively. Finger 21 is connected to finger 20 and finger $21^a$ to finger $20^a$. Fingers 22 and $22^a$ are connected in multiple with the blow-out coil BOC, which is connected with the trolley or supply side of the main circuit. L is a lead, grounded as indicated, and to which resistance-boxes R and $R'$ are connected. The first group of contacts of each drum $C'$ $C^2$ is grounded on the shaft thereof.

From the above description of the connections it will be seen that the drum $C'$ controls motors $M'$ and $M^3$, while the drum $C^2$ controls the motors $M^2$ and $M^4$, and that the two drums are electrically connected in multiple.

The operation is as follows: Starting from a position of rest with the controller-drums in their first positions, the current from the trolley passes through the blow-out coil and to the fingers 22 $22^a$ of the drums in multiple. Inasmuch as the circuit through the contacts of one drum is substantially the same as the circuit through the other drum and its two motors in all except a few positions, it will be sufficient, except as to those positions, to trace one circuit. From the finger 22 the circuit is through contacts $c^{26}$ and $c^{25}$, finger 21 to finger 23 of the reversing-switch, contacts $x$ $x^2$, finger 25, to and through armature $A'$, finger 24 to finger 26, to finger 18, contacts $c^{18}$ $c^{20}$, finger 19, finger 31, contacts $z^8$ $z^{10}$, finger 33, to and through armature $A^3$ to finger 32, contacts $z^9$ $z^{11}$, finger 34, finger 16, contacts $c^{11}$ $c^{15}$, finger 17, field $F'$, finger 14, contacts $c^7$ $c^9$, finger 15, field $F^3$, and through resistance-box R to ground. In this position therefore the current passes through each pair of motors and the resistance-box therefor in series. In position 2 the circuit is the same, except that finger 10 engages contact $c$, and thereby short-circuits a portion of the resistance, and in position 3 the engagement of finger 11 with contact $c'$ short-circuits a further section of the resistance. In position 4 the engagement of the finger 12 with the contact $c^2$ short-circuits the entire resistance. In position 41 the only change which is effected is that the finger 15 bridges the contacts $c^9$ and $c^{12}$, and thereby short-circuits the field $F'$, a similar short-circuit of field $F^2$ taking place by the bridging of the finger $15^a$ and its corresponding contacts. In position 42 the fingers 14 and 15 lose their engagement with contacts $c^7$ and $c^9$, thereby cutting out the field $F'$. Positions 41 and 42 are not notch or running positions, but occur momentarily in passing from notch position 4 to notch position 5. In position 5 finger 13 engages the contact $c^5$ and the circuit is through the two fields in multiple, the armature connections and circuits remaining as before. A similar multiple connection of the fields $F^2$ $F^4$ is of course effected. In position 51 the connections controlled by the drum $c'$ remain the same as in position 5; but owing to the fact that the contacts $c^{11}$, $c^{12}$, $c^{18}$, $c^{20}$, $c^{25}$, and $c^{26}$ of the drum $C^2$ are shorter than the corresponding contacts of the drum $C'$, as above described, the circuit is entirely opened through the motors $M^2$ $M^4$. (See position 51 of Fig. 2, also Fig. 3.) At position 52 the connections controlled by drum $C'$ still remain the same as in position 5; but on the drum $C^2$ the fingers $14^a$, $15^a$, $16^a$, $17^a$, $18^a$, $19^a$, $20^a$, $21^a$, and $22^a$ engage, respectively, the contacts $c^8$, $c^{10}$, $c^{16}$, $c^{17}$, $c^{19}$, $c^{21}$, $c^{23}$, $c^{27}$, and $c^{28}$, thereby restoring the series connection of the fields $F^2$ $F^4$ and connecting the armatures $A^2$ $A^4$ in multiple. The circuit through the motors $M^2$ $M^4$ is therefore as follows: to finger $22^a$, to contacts $c^{28}$ $c^{27}$ and finger $21^a$. Here the current divides, one part passing from finger $21^a$ to finger 27 of the reversing-switch, contacts $z^4$ $z^6$, finger 29, armature $A^2$, finger 28, contacts $z^5$ $z^7$, finger 30, finger $18^a$, contacts $c^{19}$ $c^{17}$, finger $17^a$, field $F^2$, finger $14^a$, contacts $c^8$ $c^{10}$, finger $15^a$, field $F^4$, finger $12^a$, and contact $c^3$ to ground. The other part of the current passes from finger $21^a$ to finger $20^a$, contacts $c^{23}$ $c^{21}$, finger $19^a$, finger 35 of the reversing-switch, contacts $z^{12}$ $z^{14}$, finger 37, armature $A^4$, finger 36, contacts $z^{13}$ $z^{15}$, finger 38 to finger $16^a$, and contact $c^{16}$ to contact $c^{17}$, where its path unites with that of the first branch described. At position 53 the connections controlled by drum $C^2$ remain as in position 52; but the fingers of the drum $C'$ entirely lose engagement with the contacts of the drum $C'$, and thereby open the circuit through the motors $M'$ and $M^3$. (See position 53, Fig. 2, also Fig. 5.) When position 6 is reached, the connections controlled by drum $C^2$ remain the same as in position 52; but the fingers 12 and 14 to 22, inclusive, of the drum $C'$ are engaged, respectively, with the contacts $c^3$, $c^8$, $c^{10}$, $c^{16}$, $c^{17}$, $c^{19}$, $c^{21}$, $c^{23}$, $c^{27}$, and $c^{28}$. This restores the series connection of the fields $F'$ $F^3$ and connects the armatures $A'$ $A^3$ in multiple, the circuit being similar to that traced in position 52—that is to say, the current divides between fingers 21 and 20, one part passing by way of finger 21 and the reversing-switch to and through armature $A'$, thence back through said switch to the finger 18 and contacts $c^{19}$ $c^{17}$, while the other part passes by way of finger 20, contacts $c^{21}$ $c^{23}$, finger 19, and the reversing-switch through armature $A^3$, thence back through said switch to finger 16, to contacts $c^{16}$ $c^{17}$, where the two paths unite and the current passes in series through fields $F'$ $F^3$ by way of finger $c^{15}$, field $F'$, finger 14, contacts $c^8$ $c^{10}$, finger 15, field $F^3$, finger 12, and contact $c^3$ to ground. Positions 51, 52, and 53 are not notch positions; but position 6 is a notch position. In position 61 the fingers 16, 20, and 21 and $16^a$, $20^a$, and $21^a$ have lost engagement with the respective contacts $c^{16}$, $c^{21}$, and $c^{23}$, which breaks the circuits to armatures $A^2$ and $A^4$, the other connections remaining as in position 6. At position 62 fingers 13 and $13^a$ engage their respective contacts $c^6$, and thereby short-circuit the fields $A^3$ and $A^4$. At position 63 the fingers 14 and 15 and $14^a$ and $15^a$ leave the contacts $c^8$ $c^{10}$, and thereby cut out the fields $A^3$ $A^4$. Positions 61, 62, and 63 are not notch positions. The elements of the motors are now in condition for connection in full multiple, and this is effected at position 7 by the engagement of the contacts $c^4$, $c^{13}$, $c^{14}$, $c^{22}$, and $c^{24}$ by the corresponding fingers of each drum. Without tracing out the circuits in full at this time it will be readily seen that the current at each drum will divide between the fingers 19 and 21 or $19^a$ and $21^a$, one part going through the reversing-switch by a path similar to that before traced, through armature $A'$ or $A^2$, thence back to finger 18 or $18^a$, contacts $c^{19}$ $c^{17}$, finger 17 or $17^a$, field $F'$ or $F^2$, and contact $c^6$ to ground, and the other part through the reversing-switch, armature $A^3$ or $A^4$, back to finger 16 or $16^a$, to contacts $c^{14}$ $c^{13}$, finger 15 or $15^a$, to field $F^3$ or $F^4$, to finger 13 or $13^a$, to contact $c^4$, to ground.

It will be obvious that my invention is not limited to the detailed arrangement of contacts and circuit connections which have been shown and described herein for the purpose of presenting a complete operative device, but that other specific arrangements may be readily devised which will be equally within the spirit and scope of my invention as pointed out in the appended claims.

Having thus described my invention, what I claim, and desire to secure by Letters Patent, is—

1. The combination with a plurality of electric motors, of a controller arranged to connect said motors in parallel groups, and having contacts and connections for changing the motors of each group from series to parallel relation, said contacts being differently arranged for the different groups, whereby certain circuit changes are effected successively in the different groups.

2. The combination with a plurality of electric motors, of a controller arranged to connect said motors in parallel groups, and having contacts and connections for changing the motors of each group from series to parallel relation, certain contacts in one group being of different length from the corresponding contacts of the other group or groups.

3. The combination with a plurality of electric motors, of a controller arranged to connect the same in parallel groups, said controller having a moving member for each of said groups, adapted to change the individual motors thereof from series to parallel relation, and means whereby certain steps in such change are successively effected in the different groups and without opening the circuit of more than one group at a time.

4. The combination with a plurality of electric motors designed to be operated in groups, of a controller therefor having a movable member for each group of motors, each of said members having contacts for connecting the motors of its group both in series and in parallel, and also for connecting either the fields or armatures of said motors in parallel, with the other elements in series, the said contacts being differently arranged on the different members to effect certain of said circuit conditions in one group in advance of a like effect in the other group or groups.

5. The combination with a plurality of electric motors, arranged to be operated in groups, of a controller therefor, having a movable member for each group of motors, and connecting the several groups in parallel, each of said members having one position in which the motors of its group are connected in series, a second position in which they are connected in parallel, and intermediate positions which respectively connect the fields in parallel and the armatures in series, and then the armatures in parallel and the fields in series, and means whereby the said movable members effect the last-named circuit condition successively in the different groups.

6. The combination with a plurality of electric motors, arranged to be operated in parallel groups or pairs, of a controller having a drum for each group or pair of motors, each of said drums having contacts and connections for connecting its motors both in series, both in parallel, and also either the fields or armatures only in parallel and in series with the remaining elements, and means for operating said drums simultaneously, certain contacts being of various lengths on the different drums, whereby in certain positions the different drums will at the same time effect different circuit conditions of their respective groups or pairs of motors.

In testimony whereof I have affixed my signature in presence of two witnesses.

FRANK W. GARRETT.

Witnesses:
B. M. SMITH,
H. W. SMITH.